US012367169B2

(12) United States Patent
Li et al.

(10) Patent No.: US 12,367,169 B2
(45) Date of Patent: *Jul. 22, 2025

(54) METHOD AND SYSTEM OF USING USB USER INTERFACE IN ELECTRONIC TORQUE WRENCH

(71) Applicant: Snap-on Incorporated, Kenosha, WI (US)

(72) Inventors: Jie Li, Rancho Santa Margarita, CA (US); Jerry A. King, Hacienda Hts, CA (US); Tingwen Wu, Hacienda Heights, CA (US); Nathan J. Lee, Escondido, CA (US)

(73) Assignee: Snap-on Incorporated, Kenosha, WI (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/230,548

(22) Filed: Aug. 4, 2023

(65) Prior Publication Data

US 2023/0376443 A1 Nov. 23, 2023

Related U.S. Application Data

(63) Continuation of application No. 16/804,854, filed on Feb. 28, 2020, now Pat. No. 11,797,469, which is a (Continued)

(51) Int. Cl.
*G06F 13/00* (2006.01)
*B25B 23/142* (2006.01)
(Continued)

(52) U.S. Cl.
CPC ...... *G06F 13/4282* (2013.01); *B25B 23/1425* (2013.01); *H02J 7/00034* (2020.01); *G06F 2213/0042* (2013.01)

(58) Field of Classification Search
None
See application file for complete search history.

(56) References Cited

U.S. PATENT DOCUMENTS

| 5,354,215 A | 10/1994 | Viracola |
| 6,415,342 B1 | 7/2002 | Standiford et al. |
| | (Continued) | |

FOREIGN PATENT DOCUMENTS

| CN | 104508939 | 4/2015 |
| CN | 104521094 | 4/2015 |
| | (Continued) | |

OTHER PUBLICATIONS

US 8,878,496 B1, 11/2014, Oku (withdrawn)
(Continued)

*Primary Examiner* — Henry Tsai
*Assistant Examiner* — Dean Phan
(74) *Attorney, Agent, or Firm* — Taft Stettinius & Hollister LLP (57) ABSTRACT

A communication port interface facilitates charging of a power source, such as a battery, while the power source remains coupled to a tool. The communication port interface also facilitates downloading of torque and/or angle log information from an electronic torque tool to an external device. Torque and/or angle preset job information may be entered in client software and uploaded from the external device to the electronic torque tool via the communication port interface. Additional information including real time clock information and wrench system parameters may be uploaded to the electronic torque tool via the communication port interface.

9 Claims, 10 Drawing Sheets

Related U.S. Application Data continuation-in-part of application No. 13/888,685, filed on May 7, 2013, now Pat. No. 10,585,405.

(51) Int. Cl.
  *G06F 13/42* (2006.01)
  *H02J 7/00* (2006.01)

(56) References Cited

U.S. PATENT DOCUMENTS

| | | |
|---|---|---|
| 6,573,621 B2 | 6/2003 | Neumann |
| 7,501,792 B2 | 3/2009 | Boerjesson et al. |
| 7,502,949 B2 | 3/2009 | Park |
| 7,518,343 B2 | 4/2009 | Skarine et al. |
| 7,688,037 B2 | 3/2010 | Huh |
| 7,768,239 B2 | 8/2010 | Skarine et al. |
| 7,893,660 B2 | 2/2011 | Skarine et al. |
| 8,095,713 B2 | 1/2012 | Dorogusker et al. |
| 8,242,742 B2 | 8/2012 | Guo et al. |
| 8,259,221 B1 | 9/2012 | Bacho et al. |
| 8,283,897 B2 | 10/2012 | Skarine et al. |
| 8,332,664 B2 | 12/2012 | Sander et al. |
| 8,350,522 B2 | 1/2013 | Johnson |
| 8,358,100 B2 | 1/2013 | Helfrich |
| 8,412,857 B2 | 4/2013 | Ady et al. |
| 8,610,407 B2 | 12/2013 | Skarine et al. |
| 8,618,769 B2 | 12/2013 | Johnson |
| 8,667,303 B2 | 3/2014 | Ady et al. |
| 8,723,476 B2 | 5/2014 | Helfrich |
| 8,736,227 B2 | 5/2014 | Chadbourne et al. |
| 8,756,358 B2 | 6/2014 | Su et al. |
| 8,812,883 B2 | 8/2014 | Sander et al. |
| 8,981,731 B1 | 3/2015 | Oku |
| 9,037,756 B2 | 5/2015 | Lee |
| 9,224,359 B2 | 12/2015 | Bourque |
| 9,395,780 B2 | 7/2016 | Berthout et al. |
| 9,407,101 B2 | 8/2016 | Oku |
| 9,459,670 B2 | 10/2016 | Colahan et al. |
| 9,547,617 B2 | 1/2017 | Berthout et al. |
| 9,569,609 B2 | 2/2017 | Bourque |
| 9,577,452 B2 | 2/2017 | Kuan |
| 9,627,899 B2 | 4/2017 | Lee |
| 9,634,502 B2 | 4/2017 | Irish et al. |
| 9,917,457 B2 | 3/2018 | Barnett et al. |
| 9,953,156 B2 | 4/2018 | Bourque |
| 9,990,326 B2 | 6/2018 | Aiken et al. |
| 10,114,401 B2 | 10/2018 | Furtner |
| 10,204,069 B2 | 2/2019 | Berthout et al. |
| 10,248,599 B2 | 4/2019 | Burgers et al. |
| 10,310,576 B2 | 6/2019 | Ueki |
| 10,318,394 B2 | 6/2019 | Newberry |
| 10,333,261 B2 | 6/2019 | Peng et al. |
| 10,430,360 B2 | 10/2019 | Berthout et al. |
| 10,614,013 B2 | 4/2020 | Bechtel et al. |
| 10,878,077 B2 | 12/2020 | Bourque |
| 2005/0194928 A1 | 9/2005 | Hou |
| 2007/0067547 A1 | 3/2007 | Jang |
| 2007/0145945 A1 | 6/2007 | McGinley et al. |
| 2010/0213891 A1 | 8/2010 | Nishikawa |
| 2012/0021696 A1* | 1/2012 | Chang ............... G06F 1/3278 455/73 |
| 2012/0162839 A1 | 6/2012 | Wiederhold |
| 2014/0042970 A1 | 2/2014 | Grigoryants |
| 2014/0245037 A1 | 8/2014 | Geeraert et al. |
| 2014/0351622 A1 | 11/2014 | Sander et al. |
| 2016/0043586 A1 | 2/2016 | Wang |
| 2016/0204626 A1* | 7/2016 | Cruz ............... H02J 7/007188 320/152 |
| 2016/0226278 A1 | 8/2016 | Barnett et al. |
| 2017/0039153 A1 | 2/2017 | Chen et al. |
| 2017/0060799 A1 | 3/2017 | Berthout et al. |
| 2017/0108910 A1 | 4/2017 | Goh |
| 2017/0187216 A1 | 6/2017 | Irish et al. |
| 2018/0011809 A9 | 1/2018 | Chen et al. |
| 2018/0076639 A1 | 3/2018 | Furui et al. |
| 2018/0097372 A1 | 4/2018 | Li |
| 2018/0166886 A1 | 6/2018 | Euda |
| 2018/0254648 A1* | 9/2018 | Harju ............... H02J 7/00 |
| 2019/0171600 A1 | 6/2019 | Burgers et al. |
| 2019/0215584 A1 | 7/2019 | Stampfl et al. |
| 2020/0044473 A1 | 2/2020 | Katase et al. |

FOREIGN PATENT DOCUMENTS

| | | |
|---|---|---|
| CN | 105563401 | 5/2016 |
| CN | 105762898 A | 7/2016 |
| CN | 207530268 | 6/2018 |
| CN | 108274424 | 7/2018 |
| CN | 108879842 A | 11/2018 |
| CN | 108942767 | 12/2018 |
| CN | 109950433 A | 6/2019 |
| EP | 2942853 | 11/2015 |
| JP | H0765870 | 3/1995 |
| JP | 2018062013 | 4/2018 |
| TW | I388407 | 7/2018 |
| WO | 20180205684 | 11/2018 |

OTHER PUBLICATIONS www.wikipedia.org, Thermistor, 2004, p. 1-2 (Year: 2004).*
Australian Examination Report No. 1 for corresponding AU Application No. 2023201155, dated Sep. 7, 2023, 3 pages.
United Kingdom Examination Report for corresponding UK Application No. GB2213929.9, dated Aug. 23, 2023, 5 pages.
Taiwan First Office Action for corresponding TW Application No. 112115816, dated Aug. 1, 2023, 2 pages.
Australian Examination Report No. 1 for corresponding AU Application No. 2021200856 dated Dec. 3, 2021, 5 pages.
United Kingdom Combined Search and Examination Report for corresponding UK Application No. GB2102065.6 dated Dec. 14, 2021, 8 pages.
Taiwan First Office Action for corresponding Taiwan Patent Application No. 11021244350 dated Dec. 22, 2021, 14 pages.
Examiner's Report for corresponding Application No. 3,108,639 dated Mar. 4, 2022, 5 pages.
Taiwan Office Action for corresponding Application No. 11120405540 dated Apr. 27, 2022, 4 pages.
Examination Report for corresponding Application No. GB2102065.6 dated May 27, 2022, 5 pages.
Combined Search and Examination Report for corresponding Application No. GB2213929.9 dated Mar. 17, 2023, 6 pages.
Chinese Second Office Action for corresponding CN Application No. 202110226760.4, dated Feb. 4, 2024, 18 pages.

* cited by examiner

METHOD AND SYSTEM OF USING USB USER INTERFACE IN ELECTRONIC TORQUE WRENCH

CROSS REFERENCES TO RELATED APPLICATIONS

This application is a continuation of, and claims the priority benefit to, U.S. patent application Ser. No. 16/804,854, filed Feb. 28, 2020, which is a continuation-in-part of, and claims the priority benefit to, U.S. patent application Ser. No. 13/888,685, filed May 7, 2013, the contents of which are incorporated herein by reference in their entirety.

TECHNICAL FIELD OF THE INVENTION

The present application relates to a tool for applying torque to a work piece. Particularly, the present application relates to an electronic torque wrench configured for exchanging data and settings with an external device.

BACKGROUND OF THE INVENTION

Precision tools, such as torque wrenches, are commonly used in automotive and industrial applications to apply a predetermined torque and/or angular displacement to a work piece such as a threaded fastener, for example. A particular torque and/or angular displacement may be specified in a job specification or work schedule to be applied to each work piece in a job. The precision tools are commonly adjustable and may be manually configured to apply the specified torque and/or angular displacement to each work piece in the job. Once a specified torque or angle setting is configured, the precision tool may prevent a user from exceeding a specified torque or angular displacement by actuating a mechanical release between the force applicator or handle of the tool and the work piece or head of the tool, for example. Alternately, the precision tool may simply indicate when the specified torque and/or angular displacement has been applied by providing a tactile, audible or visual indication, for example. For jobs that involve numerous different torque and/or displacement specifications, the process of resetting the tool for each different specification may be slow and labor intensive and introduces opportunities for errors.

Precision tools, such as torque wrenches, are also commonly used to measure the applied torque and/or angular displacement applied to a work piece. In many applications, the measurements of torque and/or angular displacement that are acquired by the use of such precision tools are manually recorded in a log for quality assurance purposes. The process of manually recording measurements in a log is also slow and labor intensive and introduces further opportunities for errors.

SUMMARY OF THE INVENTION

According to an aspect of the present disclosure, an electronic torque tool is configured with a universal serial bus (USB) interface. Client software may be executed on an external device such as a personal computer (PC) to populate a data set for input to the electronic torque tool or to receive measured data from the electronic torque tool via the USB interface. The USB interface may also be used to provide real time clock settings, software updates or other configuration information from an external device to the electronic torque tool.

A method according to one aspect of the present disclosure includes entering at least one set of preset job parameters to a computing device, such as a PC. The preset job parameters may include at least one torque setting and/or angular displacement setting and at least one identifier corresponding to the torque setting and/or angular displacement setting. The job parameters may be communicated from the computing device to electronic torque wrench via a USB interface.

A method according to another aspect of the present disclosure includes storing a set of torque measurements in a memory of an electronic torque wrench and communicating the set of torque measurements from the electronic torque wrench to an external computing device via a USB interface.

A method according to another aspect of the present disclosure includes receiving a real time clock setting from a computing device via a USB interface and configuring a clock of an electronic torque wrench based on the real-time clock setting. A method according to another aspect of the present disclosure includes receiving preset job parameters, tool identifiers, tool system parameters and/or software updates to an electronic torque tool from a computing device via a USB interface.

A method according to another aspect of the present disclosure includes charging a power source coupled to a tool. The method includes sending, by a charger, a first signal via a USB cable to the tool to actuate a switch of the tool to an ON position, and allowing a flow of electricity via the USB cable to the power source. The method further includes measuring, by the charger, a voltage and a temperature of the power source, via the USB cable, and ceasing the flow of electricity when the measured voltage substantially meets a voltage threshold or the measured temperature substantially meets or exceeds a temperature threshold.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

It should be understood that the comments included in the notes as well as the materials, dimensions and tolerances discussed therein are simply proposals such that one skilled in the art would be able to modify the proposals within the scope of the present application.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated.

The present disclosure involves incorporating a universal serial bus (USB) interface into a tool adapted to apply torque to work pieces, such as threaded fasteners, bolts, and nuts, such as, for example, an electronic torque wrench, to provide a computer interface for the users and wrench manufacturers. To meet the demands of automotive, industrial applications, or quality control, electronic torque wrenches may be pre-loaded with sets of torque and/or angle job presets. An embodiment of the present disclosure includes a personal computer (PC) based client software tool for communicating with electronic torque wrenches. The PC based client software tool facilitates setting up the torque and/or angle jobs using a communication port interface, such as, for example, universal serial bus (USB), Firewire, serial, parallel, infrared, wireless, or THUNDERBOLT™ port.

According to an aspect of the present disclosure, an electronic torque wrench has the capability to store torque and angle log information, representing respective amounts of torque or angular displacement applied to work pieces, into an internal memory such as a flash memory configured on the electronic torque wrench. A method for downloading the log into a computer system for records, archives or quality audit purposes is also disclosed.

Figure 1:
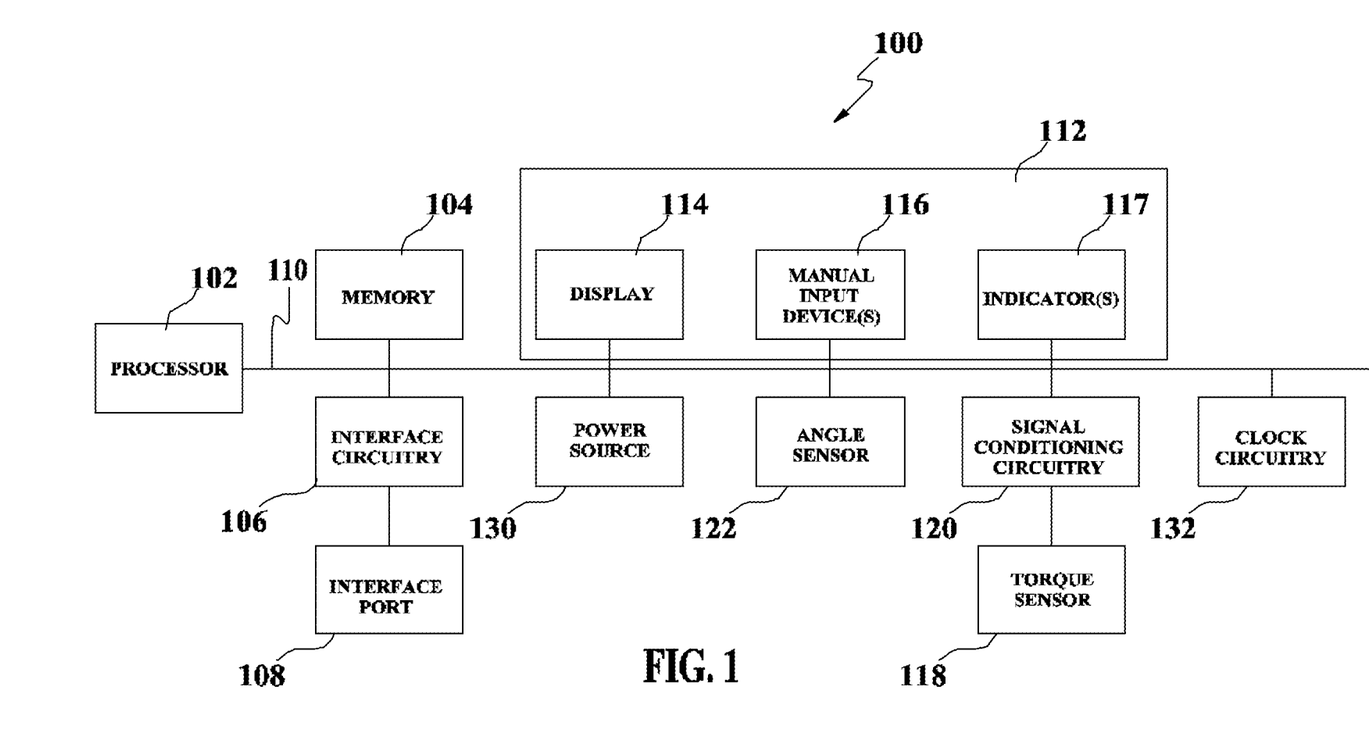
FIG. 1 is a block diagram illustrating a torque tool in accordance with an embodiment of the present application.

Referring to FIG. 1, according to an aspect of the present disclosure, a tool adapted to apply torque to work pieces, such as an electronic torque wrench 100, includes a processor 102 and a memory 104 coupled to the processor. The tool 100 also includes interface circuitry 106 operably coupled to a communication interface port 108, such as a universal serial bus (USB), Firewire, serial, parallel, infrared, wireless, or THUNDERBOLT™ port, for example.

The interface circuitry 106 and memory 104 may be coupled to the processor by one or more internal signal paths 110.

The processor 102 facilitates communication between various components of the tool 100 and controls operation of various electrical components of the tool 100. According to an aspect of the present disclosure, the memory 104 can store data or computer programs for use with the tool 100. For example, the memory 104 may be used to store preset torque and angle target values for use in an automatic setting, or store temporary torque and angle target values, for example. Without limitation, the memory 104 can include a non-transitory computer-readable recording medium, such as a hard drive, DVD, CD, flash drive, volatile or non-volatile memory, RAM, or any other type of data storage, for example.

The tool 100 may also include user interface circuitry 112 coupled to the processor 102. The user interface circuitry 112 may include a display 114 and one or more manual input devices 116, such as a set of buttons, for example. Alternately, the display 114 and input devices 116 may be integrated in a single device, such as a touch screen that performs both display and manual input functions. The user interface circuitry 112 may also include one or more indicators 117 such as, for example, light emitting diodes (LEDs) coupled to the processor 102 to provide feedback to a user.

According to one aspect of the present disclosure, the tool 100 also includes a torque sensor 118, such as strain gauge or load cell, for example, coupled to the processor 102, which is adapted to measure the amount of torque applied by the tool to a work piece. The torque sensor 118 may include signal conditioning circuitry 120, such as analog to digital converter circuitry, configured to convert an analog strain gauge or load cell output signal to a digital signal format suitable for input to or use by the processor 102, for example. An angular displacement sensor 122, which may be incorporated into the torque sensor 118 and which is adapted to measure the amount of angular displacement of the work piece, may also be coupled to the processor 102. The angular displacement sensor 122 may include a microelectromechanical system (MEMS) gyroscope, for example.

A power source 130 and clock circuitry 132 are also coupled to the processor 102. The power source 130 may include a source of electrical or power, such as one or more batteries, fuel cell, or solar cells, for example. The clock circuitry 132 may be configured to display the time, provide time stamp for torque and angle measurements, and/or to facilitate timing of various processes involved in preset torque or angle jobs, for example.

In an embodiment, the display 114 can display various information for the user to view and interpret, for example, stored or real-time measurements of torque or angular displacement, presets, or other text or graphic information. By way of example, the display 114 can include a liquid crystal display (LCD), organic light emitting diode (OLED) display, plasma screen, cathode ray tube display, or any other kind of black and white or color display that will allow the user to view and interpret information.

The indicators 117 can include structures that visually, audibly, or through tactile means, indicate to the user when a predetermined torque or angle target is reached. For example, the indicators 117 can include one or more LEDs and LCD backlight that illuminate when a preset torque or angular displacement is reached. Alternately, the indicators 117 can include a vibration mechanism that vibrates when the preset torque or angular displacement is reached.

Figure 2:
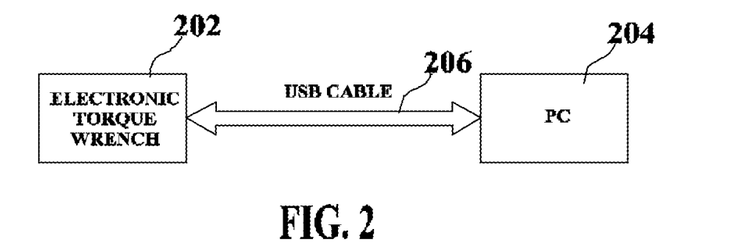
FIG. 2 is a block diagram illustrating a torque tool coupled to an external device according to an embodiment of the present application.

Referring to FIG. 2, according to one aspect of the present disclosure, a tool, such as an electronic torque wrench 202 (which may be the same as electronic torque wrench 100), may be coupled to an external device such as a personal computer 204 using a standard interface connector such as a USB cable 206, for example. This allows information such as preset job parameters, calibration information, wrench system parameters and wrench system software updates, for example, to be input to the electronic torque wrench 202 from the PC 204. The connection between the electronic torque wrench 202 and the PC 204 also allows torque and/or angular displacement measurements, representing stored torque and/or angular application to work pieces, to be downloaded from the electronic torque wrench 202 to a log on the PC, for example.

Figure 3:
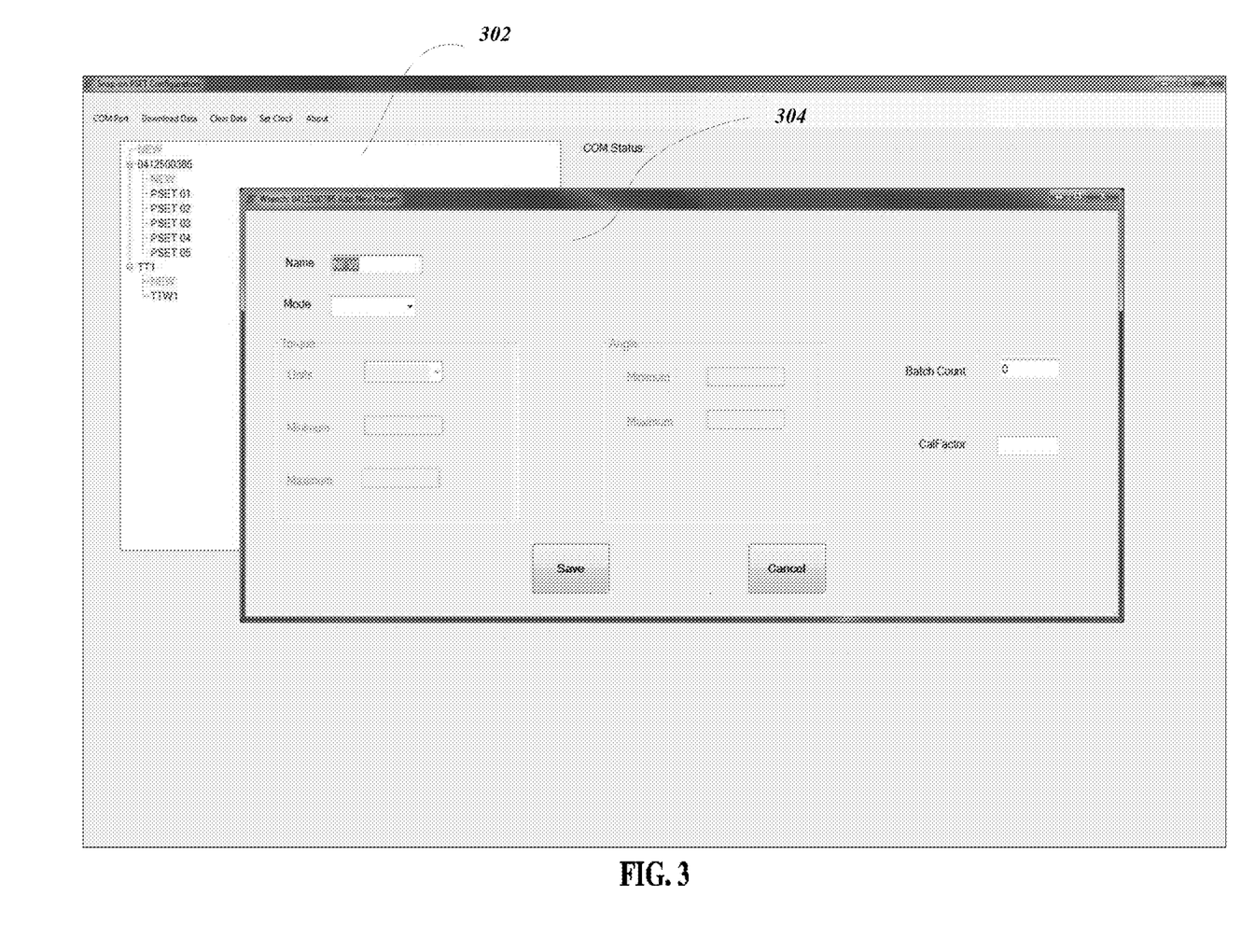
FIG. 3 is an example of a graphical user interface for entering set up information to configure preset jobs on the electronic torque wrench according to an embodiment of the present application.

Referring to FIGS. 2 and 3, the PC 204 may be configured to execute client software that provides a graphical user interface for entering set up information to configure preset jobs on the electronic torque wrench 202, for example. The client software may be configured to present one or more display screens 302 to a user for displaying the preset job settings and/or one or more data entry screens 304 to facilitate entry of new job settings or modifying existing job settings in a data set. An example of several preset job setting shown in FIG. 3 include a job identifier that may be a job number or preset name as shown and a set of parameters that correspond to the job identifier. For each job identifier, the set of parameters may include a mode selection, a minimum torque setting, a maximum torque setting, a units selection, a minimum angle setting, a maximum angle setting, a batch count and a calibration factor, for example. The mode selector is used to configure the electronic torque wrench in a particular mode, such as a torque only mode, an angle only mode, a torque then angle mode, an angle then torque mode, and a simultaneous angle and torque mode, for example.

Figure 4:
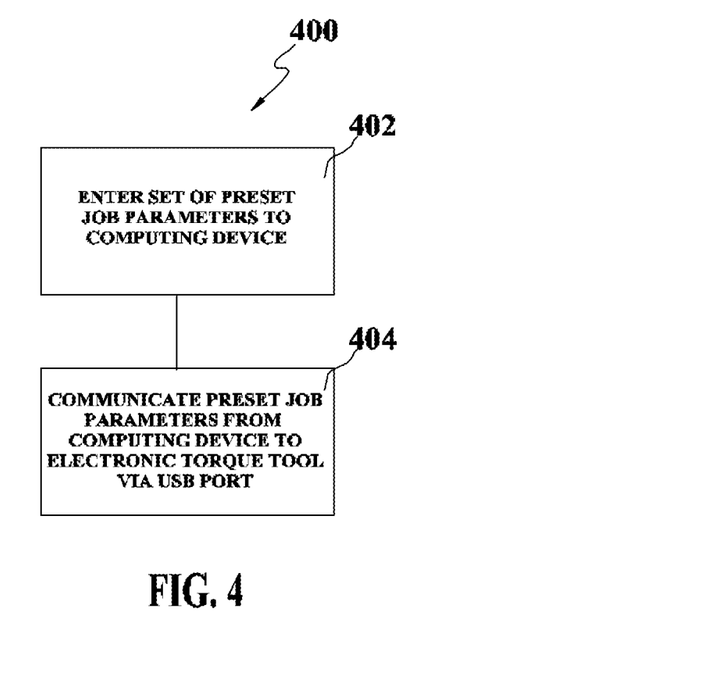
FIG. 4 is a process flow diagram illustrating a method for entering preset job parameters for an electronic torque tool according to an embodiment of the present application.

FIG. 4 is a process flow diagram illustrating a process 400 according to an aspect of the present disclosure. The process may be performed by a user of a personal computer, for example. As shown, the process 400 begins and proceeds to step 402, which includes entering at least one set of preset job parameters to a computing device, such as a PC. The preset job parameters may include at least one torque setting, representing the amount of torque that should be applied to a work piece, and at least one identifier corresponding to the torque setting. In step 404, the method includes communicating the set(s) of preset job parameters from the computing device to the electronic torque wrench.

According to an aspect of the present disclosure, the preset job parameters may include at least one angular displacement setting, representing the amount of angular displacement that should be applied to a work piece, corresponding to the torque setting. The preset job parameters may also include a calibration factor corresponding to the torque setting. Other preset job parameters that may be included in the set(s) of preset job parameters according to aspects of the present disclosure include minimum torque settings, maximum torque settings, minimum angle setting and maximum angle settings corresponding to each job identifier, for example.

According to another aspect of the present disclosure, the set of preset job parameters includes a mode selector, wherein the mode selector may select a torque only mode, an angle only mode, a torque then angle mode, an angle then torque mode, or a simultaneous torque and angle mode.

Figure 5:
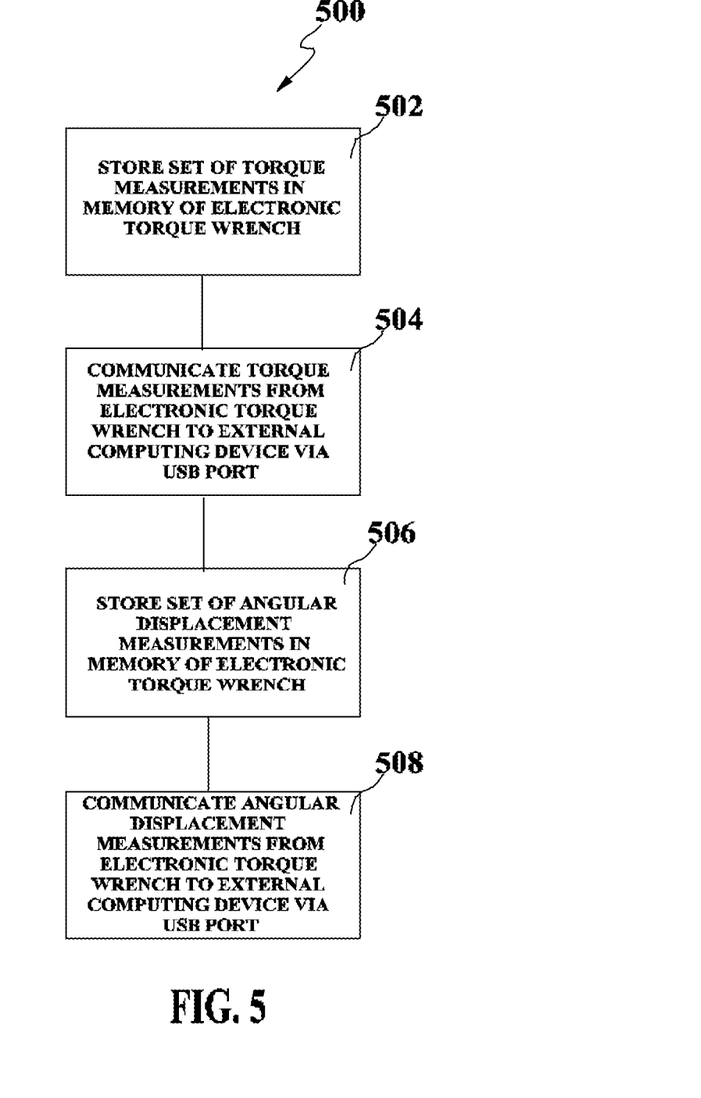
FIG. 5 is a process flow diagram illustrating a method for communicating measured data from an electronic torque tool to an external device according to an embodiment of the present application.

FIG. 5 is a process flow diagram illustrating a process 500 according to an aspect of the present disclosure. The process may be performed on a tool adapted to apply torque to a work piece, such as an electronic torque wrench, coupled to a personal computer via a cable, such as universal serial bus (USB), Firewire, serial, parallel, wireless, infrared, or THUNDERBOLT™ cable for example. As shown, the process 500 begins and proceeds to step 502, which includes storing a set of torque measurements in a memory of an electronic torque wrench. In step 504, the method includes communicating the set of torque measurements from the electronic torque wrench to an external computing device.

According to an aspect of the present disclosure, the set of torque measurements corresponds to a set of preset job parameters stored in the memory of the electronic torque wrench. According to another aspect of the present disclosure, communicating the set of torque measurements from the electronic torque wrench to an external computing device includes communicating the set of torque measurements representing the amounts of torque applied to work pieces by the torque wrench, from the memory of the electronic torque wrench to a communication port, such as a USB port, of the electronic torque wrench.

In step 506, the method includes storing a set of angular displacement measurements in the memory of the electronic torque wrench. The set of angular displacement measurements corresponds to the set of preset job parameters stored in the memory of the electronic torque wrench. In step 508, the method includes communicating the set of angular displacement measurements from the electronic torque wrench to the external computing device.

Figure 6:
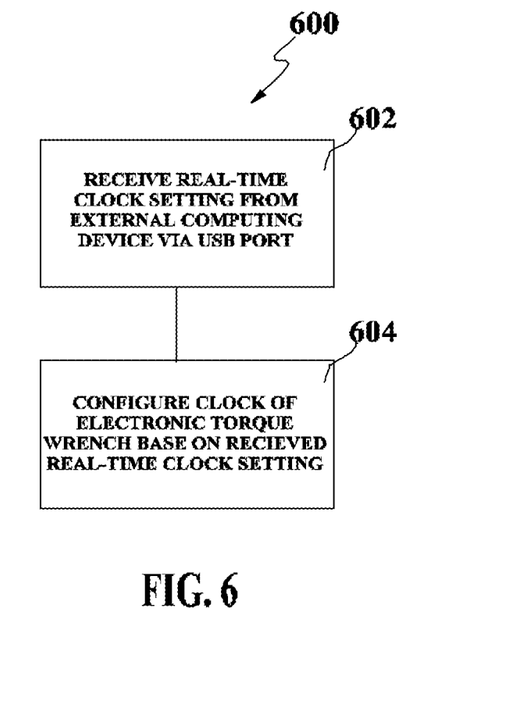
FIG. 6 is a process flow diagram illustrating a method for communicating real time clock settings to an electronic torque tool from an external device according to an embodiment of the present application.

FIG. 6 is a process flow diagram illustrating a process 600 according to an aspect of the present disclosure. The process may be performed on a tool adapted to apply torque to a work piece, such as an electronic torque wrench, including a communication port, such as a USB port, coupled to a personal computer via a communication cable, such as a USB cable, for example. As shown, the process 600 begins and proceeds to step 602, which includes receiving a real time clock setting from a computing device. In an embodiment, the real time clock can be used to time stamp data stored in the tool, such as, for example, the stored torque measurements or stored angular displacement measurements. In block 604, the method includes configuring a clock of electronic torque wrench based on the real-time clock setting.

Figure 7:
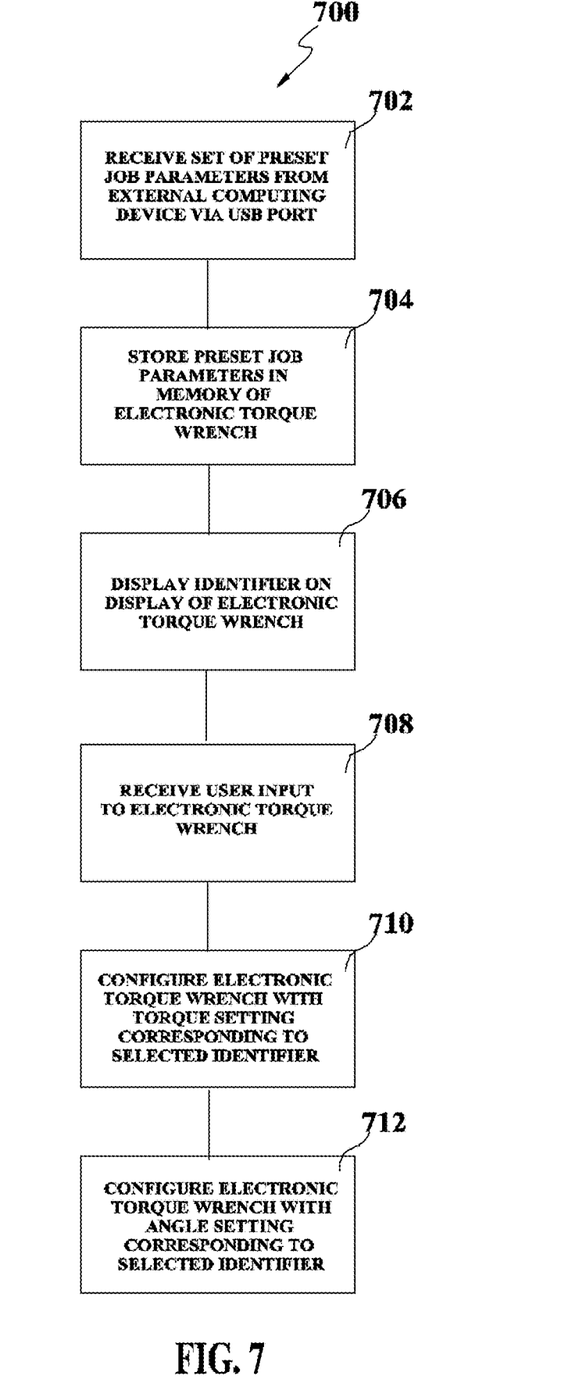
FIG. 7 is a process flow diagram illustrating a method of communicating preset job parameters to an electronic torque tool from an external device according to an embodiment of the present application.

FIG. 7 is a process flow diagram illustrating a process 700 according to an aspect of the present disclosure. The process may be performed on a tool adapted to apply torque to a work piece, such as an electronic torque wrench, including a communication port, such as a USB port, coupled to a personal computer via a communication cable, such as a USB cable, for example. As shown, the process 700 begins and proceeds to step 702, which includes receiving at least one set of preset job parameters from a computing device. The preset job parameters may include at least one torque setting and at least one identifier corresponding to the at least one torque setting, for example. In step 704, the method includes storing the set of preset job parameters in a memory of an electronic torque wrench. According to an aspect of the present disclosure, the set of preset job parameters may also include at least one angular displacement setting corresponding to the a torque setting.

In step 706, the method includes displaying the identifier on a display of the electronic torque wrench and in step 708 the method includes receiving a user input to the electronic torque wrench. The user input may indicate a selection of the identifier, for example. In step 710, the method includes configuring the electronic torque wrench with the torque setting corresponding to the selected identifier. In step 712, the method further includes configuring the electronic torque wrench with the at least one angular displacement setting corresponding to the selected identifier.

According to an aspect of the present disclosure, a tool specific identifier such as a serial number and/or model number may be received from a computing device to an electronic torque wrench via a communication port, such as a USB port, configured on the electronic torque wrench. The tool specific identifier may be stored in the memory of the electronic torque wrench. According to another aspect of the present disclosure, a tool software update may be received to an electronic torque wrench via a communication port, USB port, configured on the electronic torque wrench. The software update may be stored in the memory of the electronic torque wrench. According to another aspect of the present disclosure, a set of wrench system parameters may be received to an electronic torque wrench via a communication port, such as a USB port, configured on the electronic torque wrench. The wrench system parameters may be stored in the memory of the electronic torque wrench. According to this aspect of the disclosure, an electronic torque wrench may be configured using the wrench system parameters stored in its memory.

According to another aspect of the present disclosure an electronic torque tool includes a processor, a memory coupled to the processor, a torque sensor coupled to the processor and interface circuit, such as universal serial bus (USB) interface circuit, coupled to the processor. Instructions are stored in the memory and are executable by the processor to receive at least one set of preset job parameters from a computing device via the interface circuitry and store the set of preset job parameters the memory. According to aspects of the present disclosure, the preset job parameters may include at least one torque setting and at least one identifier corresponding to the torque setting. The instructions may further include instructions executable by the processor to store a set of torque measurements in the memory, and communicate the set of torque measurements from the electronic torque tool to an external computing device via the interface circuitry.

Figure 8:
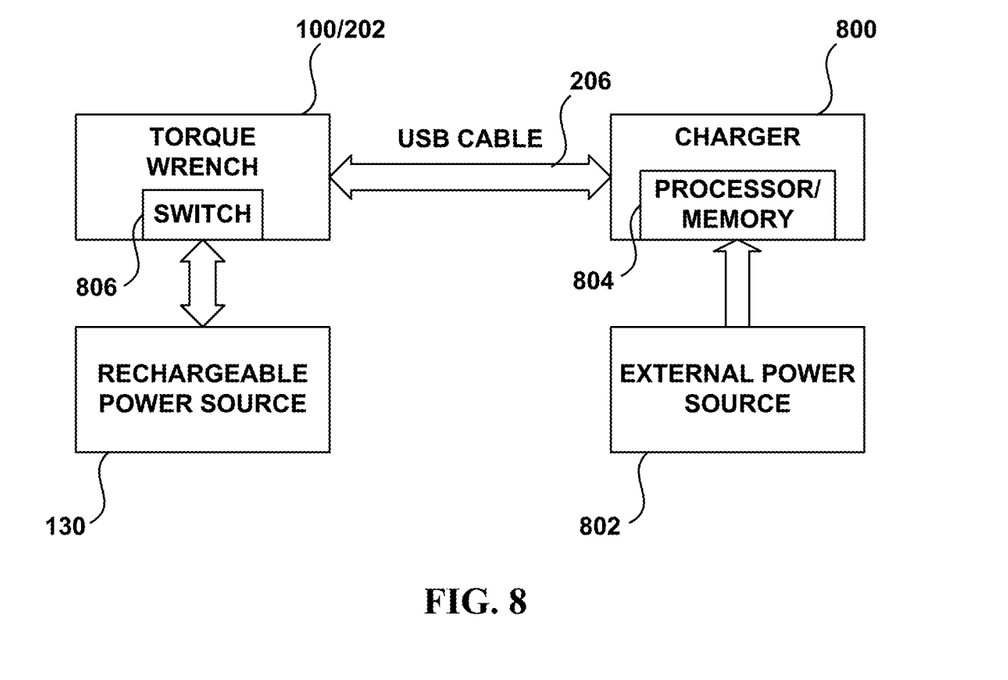
FIG. 8 is a block diagram illustrating a torque tool coupled to an external device, such as a charger, according to an embodiment of the present application.

Referring to FIG. 8, according to another aspect of the present invention, a tool, such as electronic torque wrench 100/202, may be coupled to an external device 800, such as a charger, using a standard interface connector such as a USB cable 206, for example. As described above, the electronic torque wrench 100/202 may include a power source 130. In this embodiment, the power source 130 may be a rechargeable battery that is removable from or integrated into the electronic torque wrench 100/202. The charger 800 may also be coupled to an external power source 802, such as, for example, another battery, generator, or a wall outlet. The USB cable 206 allows the charger to supply power from the external power source 802 to the power source 130 to recharge the power source 130 without requiring removal of the power source 130 from the electronic torque wrench 100/202.

The charger 800 may also include charger circuitry including a circuit board and/or charger processor and memory 804. The memory may be used to store preset threshold values and can include a non-transitory computer-readable recording medium, such as a hard drive, DVD, CD, flash drive, volatile or non-volatile memory, RAM, or any other type of data storage, for example. The charger processor 804 facilitates communication between various components of the charger 800 and controls the charging operations. For example, the charger processor 804 may monitor the voltage of the power source 130 via the USB cable 206. The charger processor 804 may also monitor the temperature of the power source 130 via the USB cable 206 to detect when the power source 130 is fully charged, and the charger 800 may then shut off to prevent damaging the power source 130 by overcharging.

For example, the charger 800 (via the charger processor 804, for example) may implement a control line in the USB cable 206 to measure an output of a thermistor embedded in the power source 130 to measure temperature. The charger 800 (via the charger processor 804, for example) may also implement another control line in the USB cable 206 to activate (or actuate to an ON position) a switch 806 in the electronic torque wrench 100/202 to enable flow of power/electricity to the power source 130, thereby charging of the power source 130. This control line is not present in a normal USB data connection, thus the electronic torque wrench 100/202 may disable (actuates to the OFF position) the switch 806 to cease charging when the power source is fully charged and prevent damage to the power source 130 due to overcharging. electronic torque wrench 100/202.

Figure 9:
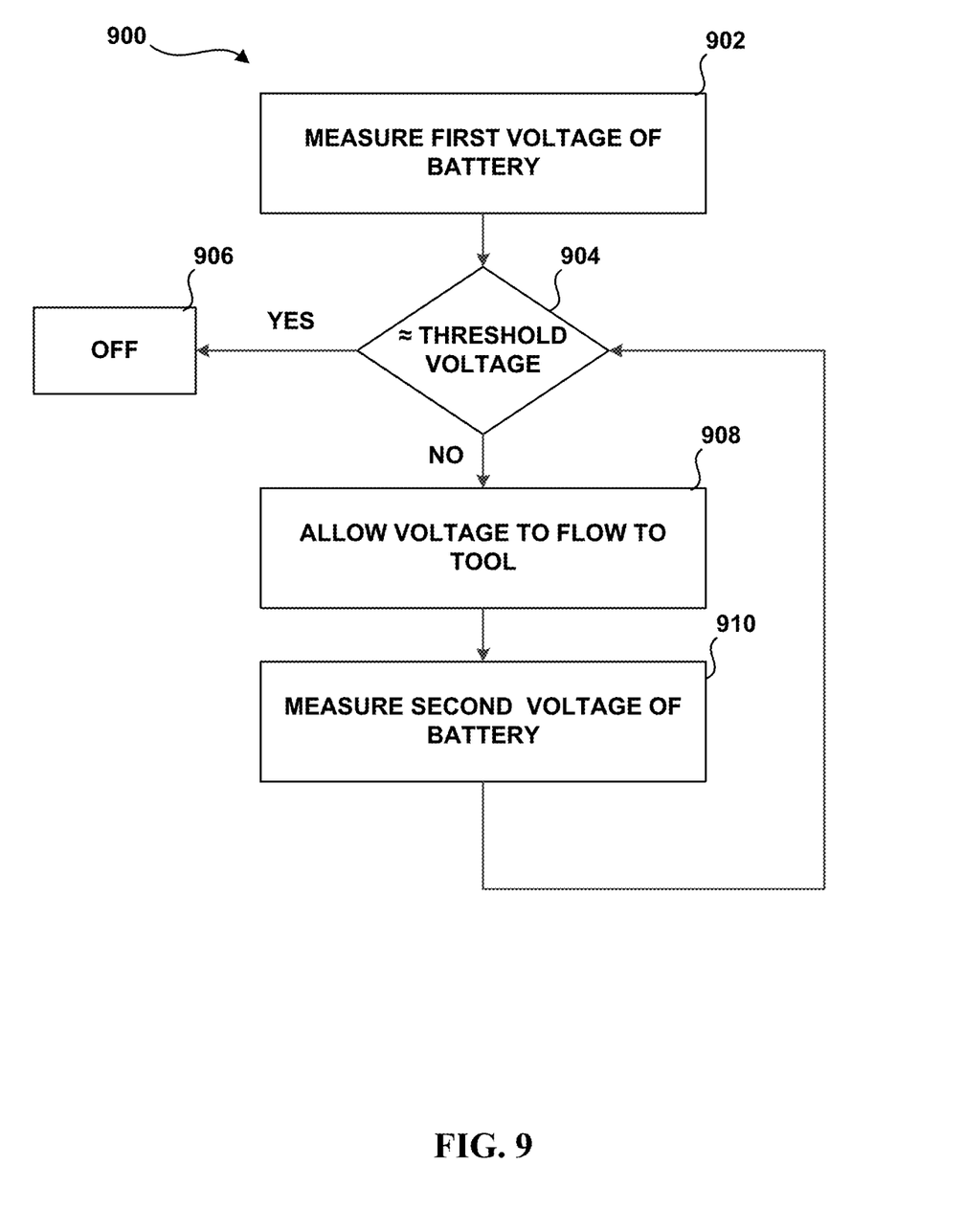
FIG. 9 is a process flow diagram illustrating a method of charging a power source coupled to an electronic torque tool according to an embodiment of the present application.

Referring to FIG. 9, according to another aspect of the present invention, a method 900 of charging a power source coupled to the electronic torque wrench 100/202 is illustrated. To start a charging operation, the charger 800 is coupled to the power source 802 and the USB cable 206. The USB cable 206 is also coupled to the electronic torque wrench 100/202 (via communication interface port 108, for example). The power source 130 also remains coupled to the electronic torque wrench 100/202.

At step 902, the charger 800 may measure a first voltage of the power source 130, via the USB cable 206 using the charger processor 804, for example. At step 904, the charger 800 determines whether the measured first voltage of the power source 130 substantially meets a threshold voltage, using the charger processor 804, for example. If the measured first voltage of the power source 130 substantially meets the threshold voltage, the charger 800 may turn OFF, at step 906. This may include ceasing flow of power/electricity to the electronic torque wrench 100/202 and/or sending a signal via the USB cable 206 to disable (or actuate to the OFF position) the switch 806.

If the measured first voltage of the power source 130 does not substantially meets the threshold voltage, the charger 800 may turn ON, and enable flow of power/electricity to the electronic torque wrench 100/202, to charge the power source 130, at step 908. This may include sending a signal via the USB cable 206 to activate (or actuate to the ON position) the switch 806.

The charger 800 may measure a second voltage of the power source 130, via the USB cable 206 using the charger processor 804, for example, at step 910, and continue measuring the voltage in a feedback type loop until the power source 130 is fully charged. For example, again, at step 904, the charger 800 determines whether the measured second voltage of the power source 130 substantially meets the threshold voltage, using the charger processor 804, for example. If the measured second voltage of the power source 130 substantially meets the threshold voltage, the charger 800 may turn OFF, at step 906. If the measured second voltage of the power source 130 does not substantially meet the threshold voltage, the charger 800 may continue to enable flow of power/electricity to the electronic torque wrench 100/202, to charge the power source 130, at step 908.

Figure 10:
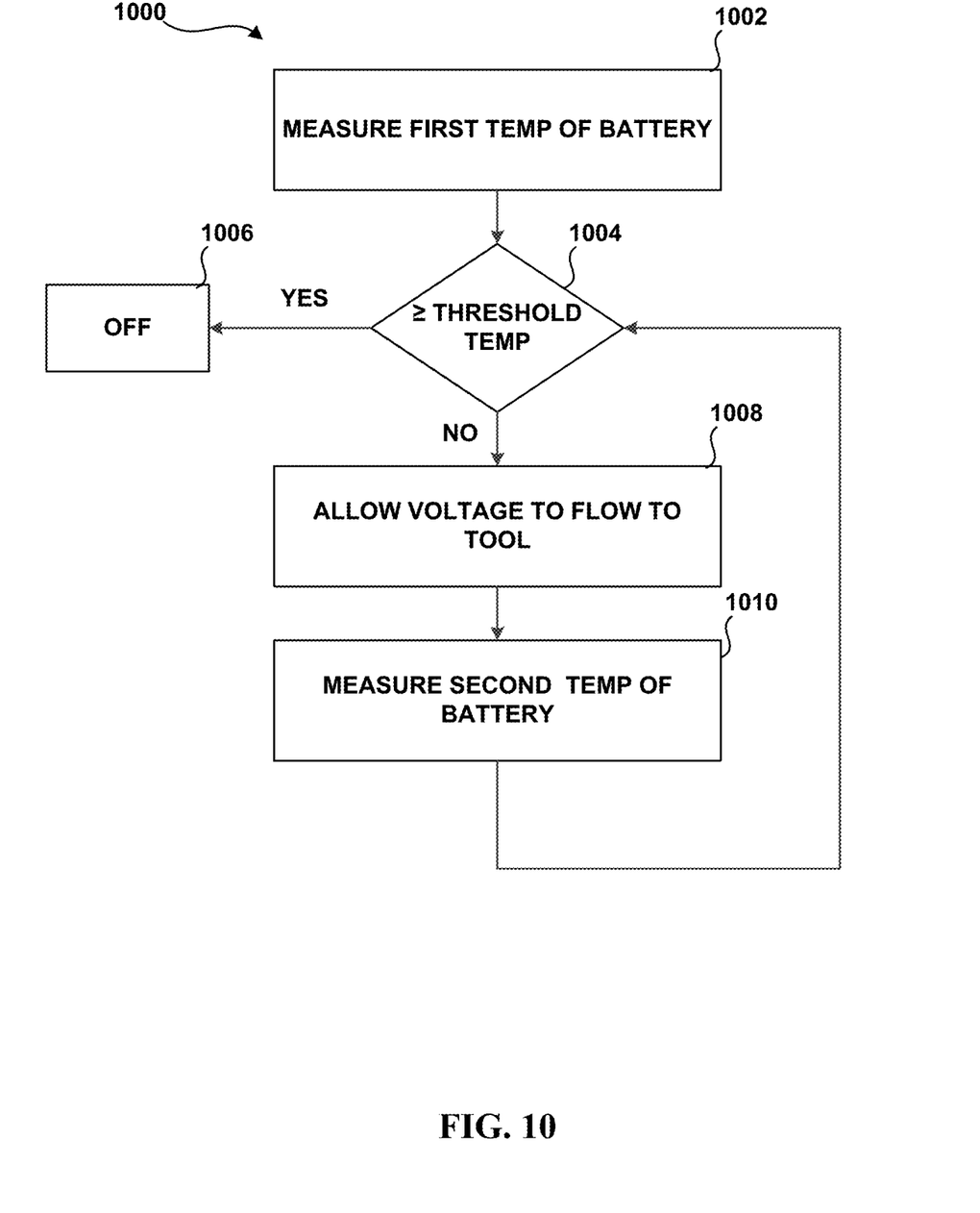
FIG. 10 is a process flow diagram illustrating another method of charging a power source coupled to an electronic torque tool according to an embodiment of the present application.

Referring to FIG. 10, according to another aspect of the present invention, a method 1000 of charging a power source coupled to the electronic torque wrench 100/202 is illustrated. To start a charging operation, the charger 800 is coupled to the power source 802 and the USB cable 206. The USB cable 206 is also coupled to the electronic torque wrench 100/202 (via communication interface port 108, for example). The power source 130 also remains coupled to the electronic torque wrench 100/202. The methods 900 and 1000 may be performed simultaneously to charge the power source 130, and prevent damage to the power source 130 due to overheating and/or over charging.

At step 1002, the charger 800 may measure a first temperature of the power source 130. This may be measured by the charger 800 implementing a control line in the USB cable 206 using the charger processor 804, for example, to receive an output of a thermistor embedded in the power source 130.

At step 1004, the charger 800 determines whether the measured first temperature of the power source 130 is greater than or substantially meets a threshold temperature, using the charger processor 804, for example. If the measured first temperature of the power source 130 is greater than or substantially meets the threshold temperature, the charger 800 may turn OFF, at step 1006. This may include ceasing flow of power/electricity to the electronic torque wrench 100/202 and/or sending a signal via the USB cable 206 to disable (or actuate to the OFF position) the switch 806.

If the measured first temperature of the power source 130 is less than or does not substantially meet the threshold temperature, the charger 800 may turn ON, and enable flow of power/electricity to the electronic torque wrench 100/202, to charge the power source 130, at step 1008. This may include sending a signal via the USB cable 206 to activate (or actuate to the ON position) the switch 806.

The charger 800 may measure a second temperature of the power source 130, via the USB cable 206 using the charger processor 804, for example, at step 1010, and continue measuring the temperature in a feedback type loop until the power source 130 is fully charged or reaches the threshold temperature. For example, again, at step 1004, the charger 800 determines whether the measured second temperature of the power source 130 is greater than or substantially meets the threshold temperature, using the charger processor 804, for example. If the measured second temperature of the power source 130 is greater than or substantially meets the threshold temperature, the charger 800 may turn OFF, at step 1006. If the measured second temperature of the power source 130 is less than or does not substantially meets the threshold temperature, the charger 800 may continue to enable flow of power/electricity to the electronic torque wrench 100/202, to charge the power source 130, at step 1008.

As discussed above, the tool 100 may be an electronic torque wrench. However, it should be understood that the tool 100 can be any mechanism for applying torque to a work piece without departing from the scope of the present application. For example, and without limitation, the precision tool 100 can be a ratchet wrench, open wrench, monkey wrench, or any other tool capable of applying torque to a work piece.

As used herein, the term "coupled" or "communicably coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A charger adapted to charge a power source coupled to a tool, comprising:
   a USB cable coupling the charger and the tool, and having first and second control lines, wherein the charger is adapted to:
   send a first signal via the first control line to the tool to actuate a switch of the tool to an ON position;
   allow a flow of power via the USB cable to the power source coupled to the tool;
   measure a voltage of the power source, via the USB cable; and
   cease the flow of power to the power source when the measured voltage substantially meets a voltage threshold.

2. The charger of claim 1, wherein the charger is adapted to cease the flow of power by sending a second signal via the first control line to the tool to actuate the switch of the tool to an OFF position.

3. The charger of claim 1, wherein the charger is further adapted to measure a temperature of the power source, via the second control line.

4. The charger of claim 3, wherein the charger is further adapted to cease the flow of power to the power source when the measured temperature substantially meets or exceeds a temperature threshold.

5. The charger of claim 4, wherein the charger is adapted to measure the temperature of the power source by receiving an output of a thermistor embedded in the power source.

6. The charger of claim 4, wherein the charger is adapted to cease the flow of power by sending a second signal via the first control line to the tool to actuate the switch of the tool to an OFF position.

7. A charger adapted to charge a power source coupled to a tool, comprising:
   a USB cable coupling the charger and the tool, and having first and second control lines, wherein the charger is adapted to:
   send a first signal via the first control line to the tool to actuate a switch of the tool to an ON position;
   allow a flow of power via the USB cable to the power source coupled to the tool;
   measure a temperature of the power source via the second control line; and
   cease the flow of power to the power source when the measured temperature substantially meets a temperature threshold.

8. The charger of claim 7, wherein the charger is adapted to cease the flow of power by sending a second signal via the first control line to the tool to actuate the switch of the tool to an OFF position.

9. The charger of claim 7, wherein the charger is adapted to measure the temperature of the power source by receiving an output of a thermistor embedded in the power source.

* * * * *